2,910,496
PROCESS FOR PRODUCING ACYLOXYSILICON COMPOUNDS

Donald L. Bailey, Snyder, and Francis M. O'Connor, Kenmore, N.Y., assignors to Union Carbide Corporation, a corporation of New York No Drawing. Application June 26, 1956
Serial No. 593,808

14 Claims. (Cl. 260—448.8)

This invention relates to a process for producing silicon-containing organic compounds. More particularly this invention is directed to a process for producing acyloxysilicon compounds from alkylsiloxanes and monocarboxylic organic acids and/or anhydrides thereof. The acyloxysilicon compounds produced in our process may be represented by the graphical formula:

$$X[RXSiO]_n SiX_2 R \qquad (1)$$

wherein $n$ is an integer from 0 to 2; wherein $X$ is an alkyl group or an acyloxy group, wherein at least one group represented by $X$ is a group other than an alkyl group, and wherein $R$ is an alkyl group.

As used herein an acyloxy group is a group having the formula:

$$R'-\overset{\overset{\displaystyle O}{\|}}{C}-O-$$

or alternately written $$R'COO-$$

where $R'$ is a hydrogen atom, an aryl group or an alkyl group; and as used herein the word or prefix acyloxy is used to denote the presence of a combined acyloxy group. Thus an organic acyloxy compound is an organic compound containing a combined acyloxy group and an acyloxysilicon compound is a compound containing combined silicon and a combined acyloxy group. Illustrative of acyloxy groups are the acetoxy group (i.e. $CH_3COO-$), the propanoyloxy group (i.e. $C_2H_5COO-$), the butanoyloxy group (i.e. $C_3H_4COO-$), the benzoyloxy group (i.e. $C_6H_5COO-$) and the like.

Acyloxysilicon compounds that correspond to graphical Formula 1 are useful starting materials in known processes. By way of illustration, the acyloxy groups present in the dialkyldiacyloxysilane products of our process can be hydrolyzed, the hydrolyzate so produced can be dehydrated and the dehydrated hydrolyzate can be polymerized to produce dialkylpolysiloxanes. These dialkylpolysiloxanes are useful in producing viscous oils and gums that can be converted to silicone elastomers.

It is known that acyloxysilane compounds can be produced by reacting metallic salts of organic acids and chlorosilanes. The same or similar reactions are not well suited, as far as it is known, for the production of acyloxysiloxanes. One reason for this is the difficulty in producing the necessary chlorosiloxane starting materials. This difficulty arises because, during the conventional hydrolysis and dehydration reactions used to form the silicon to oxygen to silicon bonds present in siloxanes, any silicon to chlorine bonds tend to be replaced by silicon to oxygen bonds.

We have found that acyloxysilicon compounds that may be represented by graphical Formula 1 can be produced by heating a mixture of an alkylsiloxane, a monocarboxylic organic acid and/or an anhydride thereof and a catalyst to a temperature sufficiently elevated to cause the siloxane and the organic acid and/or anhydride thereof to react to produce said acyloxysilicon compounds. If a monocarboxylic organic acid reactant is present in the reaction mixture, water is formed during our process and the water must be continuously removed during our process to produce the desired acyloxysilicon compounds.

The alkylsiloxanes used as reactants in our process are compounds that may be represented by the graphical formula:

$$(R_3SiO_{0.5})_q (R_2SiO)_r (RSiO_{1.5})_s \qquad (2)$$

wherein $R$ is an alkyl group such as a methyl, ethyl or propyl group; and $q$, $r$ and $s$ are zero or integers and have a sum of at least 2. Illustrative of alkylsiloxanes that are suitable for use as reactants in our process are such linear compounds as hexamethyldisiloxane, octamethyltrisiloxane and the like; such cyclic compounds as hexamethylcyclotrisiloxane, octamethylcyclotetrasiloxane and the like; such cross-linked materials as the condensed cohydrolyzates produced when mixtures of methyltrichlorosilane, dimethyldichlorosilane and trimethylchlorosilane are cohydrolyzed and condensed; and such polymeric materials as dimethylpolysiloxane oils and gums. The alkylsiloxane reactants used in our process may have molecular weights of from 162 (e.g. when hexamethyldisiloxane is used as a reactant) up to 1,000,000 and above (e.g. when a dimethylpolysiloxane gum is used as a reactant).

The instant process provides for the use of the alkylsiloxanes that conform to graphical Formula 2 whether their structure is linear, cyclic or crosslinked. The alkylsiloxane reactants of our process may contain small amounts of such constituents as, for example, carbon to carbon chains linking the molecules of the alkylsiloxane, halogen atoms bonded to silicon atoms, alkenyl groups bonded to silicon atoms and the like. Carbon to carbon chains linking the molecules of an alkylsiloxane are often present in alkylsiloxanes that have been mixed with fillers and converted to silicone elastomers. Regardless of chemical modifications, such as carbon to carbon crosslinking between the molecules or physical modifications, such as the incorporation of a filler, alkylsiloxanes that conform essentially to graphical Formula 2 are useful reactants in our process.

The alkylsiloxanes that can be used as reactants in our process are produced by known methods. By one known method a dialkyldichlorosilane is hydrolyzed to produce a hydrolyzate. The hydrolyzate is then converted to a dialkylpolysiloxane gum by heating the hydrolyzate in the presence of a basic catalyst. The gum so produced is useful as a reactant in our process.

The organic acids used as reactants in our process are monocarboxylic organic acids. Monocarboxylic aromatic acids, such as benzoic acid, and monocarboxylic aliphatic acids having from 1 to 18 carbon atoms per molecule, such as stearic acid, can be used as reactants in our process. However, we prefer to use monocarboxylic aliphatic acids that contain from 2 to 7 carbon atoms per molecule as reactants in our process. Illustrative of the preferred organic acid reactants are acetic acid, propionic acid, butyric acid and the like. Instead of all or some of one of the above-mentioned monocarboxylic organic acids, the corresponding anhydride of the monocarboxylic organic acid may be used as a reactant in our process. By way of illustration, a mixture of acetic anhydride and acetic acid or acetic anhydride alone may be used as a reactant in place of acetic acid to produce acetoxy substituted products according to our process.

The monocarboxylic organic acids and the anhydrides thereof that may be used as reactants in our process are organic acyloxy compounds. These organic acyloxy compounds may be represented by the graphical formula $$R''COOR'''$$

wherein $R''$ is an alkyl group that contains from 1 to 17 carbon atoms or an aryl group or a hydrogen atom and wherein R''' is a hydrogen atom or an OCR'' group. We prefer to use as reactants in our process organic acyloxy compounds that may be represented by the graphical formula, $$R''COOR'''$$

wherein R'' is an alkyl group that contains from one to six carbon atoms and wherein R''' is a hydrogen atom or an OCR'' group.

The organic acid reactant used in our process may be present in an amount equal to from about 0.5 to about 10 gram-moles per gram-atom of combined silicon in the alkylsiloxane reactant, but we prefer that the organic acid be present in an amount equal to from about 1.0 to about 5.0 gram-moles per gram-atom of combined silicon in the alkylsiloxane reactant. The relative amounts of the organic acid and alkylsiloxane reactants present in the reactor are not narrowly critical and so relative amounts other than the indicated ratios may be used. However, no commensurate advantage is gained by operating our process using other than the indicated ratios of reactants. In place of all or a part of the monocarboxylic organic acid reactant an equivalent amount of the corresponding organic acid anhydride may be used in our process.

In view of the reactants used and the products obtained it appears that the reactions that take place between our reactants can be illustrated by the following equations:

$$(R_3SiO_{0.5})_q(R_2SiO)_r(RSiO_{1.5})_s + R'COOH \rightleftharpoons \quad (3a)$$
$$R_3SiOOCR' + R'COO(R_2SiO)_nSiR_2OOCR'$$
$$+ RSi(OOCR')_3 + H_2O$$

and/or $$(R_3SiO_{0.5})_q(R_2SiO)_r(RSiO_{1.5})_s + (R'CO)_2O \rightleftharpoons \quad (3b)$$
$$R_3SiOOCR' + R'COO(R_2SiO)_nSiR_2OOCR'$$
$$+ RSi(OOCR')_3$$

wherein $n$ is 0, 1 or 2; wherein R is an alkyl group, wherein $q$, $r$ and $s$ are zero or integers and have a sum of at least 2; and wherein R' is a hydrogen atom, an aryl group or an alkyl group. The acyloxysilicon products shown in Equations 3a and 3b may be represented alternately by graphical Formula 1.

The major part of acyloxysilicon products formed in accordance with our process is usually of the type shown in Equations 3a and 3b. That is, the silicon atoms that are trifunctional in the alkylsiloxane reactant are usually converted to monosilicon-containing triacyloxysilanes. Similarly, silicon atoms that are monofunctional in the alkylsiloxane reactant are usually converted to monosilicon-containing monoacyloxysilanes. On the other hand, the silicon atoms that are difunctional in the alkylsiloxane reactant are usually converted to disilicon-containing or trisilicon-containing diacyloxysiloxanes or to monosilicon-containing diacyloxysilanes (i.e., $n$ in Equations 3a and 3b may be 0, 1 or 2).

Illustrative of these acyloxysilicon products that are usually produced in large amounts by our process are the bis(dialkylacyloxysiloxy)dialkylsilanes, the dialkylacyloxysiloxydialkylacyloxysilanes, the alkyltriacyloxysilanes, the dialkyldiacyloxysilanes and the trialkylacyloxysilanes.

Only small amounts of such compounds as disilicon-containing and trisilicon-containing acyloxysiloxanes containing monofunctional and/or trifunctional silicon atoms are normally produced along with the type of products illustrated by Equations 3a and 3b. Similarly, only small amounts of such compounds as diacyloxysiloxanes containing more than three difunctional silicon atoms are usually produced in our process. However, when desired, the yields of these products can be increased by using low organic acid to combined silicon atom ratios in the reaction mixture and by conducting our process for short periods of time.

Illustrative of the acyloxysilicon products usually produced in small amounts by our process are the bis(trialkylsiloxy)alkylacyloxysilanes, the trialkylsiloxyalkyldiacyloxysilanes and the bis(acyloxy)octaalkyltetrasiloxanes.

When a monocarboxylic organic acid was used as a reactant in our process, it was found that to produce the desired products (i.e. those that may be represented by graphical Formula 1), it was necessary to continuously remove the water that was formed during our process. If the water was not removed continuously, essentially only high molecular weight acyloxysilicon products were obtained. It appears that the reaction shown by overall Equation 3a proceeds by a series of steps whereby successive silicon to oxygen to silicon bonds are broken as shown below in Equations 4a and 4b. Equations 4a and 4b illustrate the stepwise reaction of a trialkylsiloxy endblocked alkylsiloxane comprising combined difunctional dialkylsiloxane groups with a monocarboxylic organic acid.

$$R(R_2SiO)_tSiR_3 + 2R'COOH \quad (4a)$$
$$\rightleftharpoons R(R_2SiO)_tOCR' + R_3SiOOCR' + H_2O$$

$$R(R_2SiO)_tOCR' + 2R'COOH \quad (4b)$$
$$\rightleftharpoons R(R_2SiO)_{t-1}OCR' + R_2Si(OOCR')_2 + H_2O$$

wherein $t$ is an integer greater than one; wherein R is an alkyl group and wherein R' is a hydrogen atom, an alkyl group or an aryl group. The removal of the water formed in our process seems to favor the equilibrium that appears to exist among the reactants and products shown in Equations 4a and 4b in such a manner as to produce larger amounts of products having a lower silicon content than the reactants.

The water that is formed during our process when a monocarboxylic organic acid is used as a reactant can be continuously removed from the reaction mixture as it is formed by any one of several known means. By way of illustration, the reaction mixture may be heated to the boiling point of the water and the water distilled off, but this means of removing the water usually requires a higher temperature operation of our process than the hereinafter-mentioned means. We can remove the water by adding to the reactants a liquid organic compound which forms an azeotrope with the water, heating the reaction mixture to a temperature at which the desired reaction occurs and at which the azeotrope is at its boiling point and distilling the azeotrope from the reaction mixture. The liquid organic compounds so used to remove the water formed in our process are termed hereinafter as "azeotrope formers." Alternately, a hydrophilic adsorbent may be placed in the reaction mixture to remove the water formed in the reaction.

We prefer to remove the water formed in our process by adding the anhydride of the monocarboxylic organic acid that is being used as a reactant in our process to the reaction mixture. The anhydride is added in an amount sufficient to remove the water formed by the reaction of the monocarboxylic organic acid and the alkylsiloxane reactants by reacting with the water so formed under the conditions used in our process to form a monocarboxylic organic acid. These reactions are illustrated by Equations 5a and 5b.

$$\equiv Si-O-Si\equiv + 2R'COOH \rightleftharpoons 2R'COOSi\equiv + H_2O \quad (5a)$$

$$(R'CO)_2O + H_2O \rightarrow 2R'COOH \quad (5b)$$

wherein R' is an aryl group, an alkyl group or a hydrogen atom.

When an azeotrope former is added to the reaction mixture as a means to remove the water formed in our process (i.e. when a monocarboxylic organic acid reactant is used) the azeotrope formed during the process may contain two components (i.e. the water and the azeotrope former) or it may contain three components (i.e. the water, the azeotrope former and the monocarboxylic organic acid reactant). In any case, we prefer to condense the azeotrope and to separate the water from the condensed azeotrope after it has been distilled from the reaction mixture. The anhydrous portion of the condensate can then be returned to the reaction mixture. Any suitable means can be used to remove the water from the condensed azeotrope. By way of illustration, the condensed azeotrope can be passed through a hydrophilic adsorbent which will selectively adsorb the water present in the condensed azeotrope.

The reaction of our process can be performed within the azeotrope former. That is, the azeotrope former can be a compound within which the reactants of our process are soluble. By this means the reactants can be brought into intimate contact thereby promoting the desired reaction. Azeotrope formers that are useful in our process both in forming the desired azeotrope and in dissolving the reactants are cyclic hydrocarbons, illustrative of which are toluene, cyclohexane, xylene and benzene.

The azeotrope former used in our process can be present in the reaction mixture in amounts of from about 0.05 part to about 5.0 parts per part by weight of the reactants. We prefer to employ amounts of the azeotrope former of from about 0.25 part to about 2.0 parts per part by weight of the reactants. Since the amount of the azeotrope former present in the reaction mixture is not narrowly critical, other than the indicated amounts may be used but no commensurate advantage is gained thereby.

The temperature used in our process is not narrowly critical. Thus temperatures of from about 50° C. to about 235° C. are useful; but we prefer to use temperatures in the range of from about 100° C. to about 200° C. Temperatures outside of the indicated ranges may be used but no commensurate advantage is gained thereby. Above 235° C. undesirable decomposition and disproportionation reactions involving the alkylsiloxane reactant occur and the organic acid reactant begins to decompose.

In order to separate the water formed in our process as a distillable azeotrope when a monocarboxylic organic acid reactant is used, it is necessary to conduct our process at the boiling point of the reaction mixture. To insure that the reaction mixture boils within the wider temperature range given above, sub-atmospheric or super-atmospheric pressures can be employed. We operate our process within the wider above-mentioned temperature range and preferably at atmospheric pressure. Hence those azeotrope formers and organic acid reactants whose boiling points make them amenable to this method of operation are preferred.

We use a catalyst in our process. Useful catalysts in our process are acidic compounds. Illustrative of the acidic compounds that are suitable for use in this invention as catalysts is sulfuric acid. The concentration of the catalyst used is not narrowly critical. Thus catalyst concentrations of from about 0.5 to about 10 parts of catalyst per 100 parts by weight of the alkylsiloxane reactant are useful, but catalyst concentrations of from about 1 to about 4 parts of catalyst per 100 parts by weight of the alkylpolysiloxane reactant are preferred. Other catalyst concentrations may be used but no additional advantage is gained thereby.

At the completion of the reaction the desired acyloxysilicon products can be separated from the reaction mixture. To accomplish this the catalyst can be neutralized, the reaction mixture stripped of azeotrope former (if one was used), the residue filtered and the filtrate fractionally distilled to produce as a distillate the desired acyloxysilicon products.

The following example illustrates our invention:

*Example*

Seventy-four grams of octamethylcyclotetrasiloxane, 122 grams of acetic anhydride, 6 grams of acetic acid and 1 gram of concentrated sulfuric acid were placed in a 500 milliliter flask that was equipped with a reflux condenser. The reaction mixture was heated under reflux conditions at a kettle temperature of 136° C. to 147° C. for 40 hours. Ten grams of potassium acetate were then added to neutralize the sulfuric acid. The reaction mixture was thereupon filtered and stripped of water and residual acetic acid and acetic anhydride under reduced pressure. The residue obtained thereby comprised higher boiling fractions which were fractionated under reduced pressure to produce the following fractions:

| Fraction | Boiling Point (°C) | Pressure (mm. Hg) | Wt. (grams) | $n_D^{25}$ | Density (grams/ml.) |
|---|---|---|---|---|---|
| I | 56–57 | 10 | 20.0 | 1.4012 | 1.048 |
| II | 57–82 | 10 | 11.0 | | |
| III | 81–82 | 9.5 | 33.0 | 1.4008 | 1.021 |
| IV | 82–106 | 9.5 | 7.0 | | |
| V | 106–107 | 9.5 | 17.0 | 1.4008 | 1.009 |
| VI | Residue | | 10.0 | | |

Fraction I was identified by molar refraction as diacetoxydimethylsilane and represented a 19.9 mole-percent yield of this acyloxy product; Fraction III identified as acetoxydimethylsiloxyacetoxydimethylsilane and represented a 36.5 mole-percent yield; and Fraction V was identified as bis(acetoxydimethylsiloxy)dimethylsilane and represented a 23.7 mole-percent yield.

As an alternative to using a mixture of acetic acid and acetic anhydride, either acetic acid alone or acetic anhydride alone could be heated with octamethylcyclotetrasiloxane and sulfuric acid as described in the above example to produce the acyloxysilicon compounds produced in the above example. However, where acetic acid alone is used, one of the above-described means must be used to remove the water formed in the process.

Following a procedure similar to that used in the above example, butanoyloxysilicon compounds (i.e.

$$C_3H_7COOSi\equiv$$

type compounds) can be prepared by a process such as the following. A reaction mixture of butanoic acid, an ethylpolysiloxane that is composed chiefly of combined groups that may be represented by the graphical formula $(C_2H_5SiO_{1.5})$, a catalytic amount of sulfuric acid and toluene can be formed and heated to the boiling point of the mixture. The butanoic acid would combine with the siloxane to produce chiefly ethyltributanoyloxysilane (i.e. $(C_3H_5COO)_3SiC_2H_5$) and water. The water so formed would be distilled from the reaction mixture as a component of an azeotrope that contains the water and the toluene. The azeotrope would be condensed and then freed of water by passing it through a hydrophilic adsorbent. The anhydrous portion of the condensate would be returned to the reaction mixture.

We claim:

1. A process for producing acyloxysilicon compounds that are represented by the graphical formula $$X[RXSiO]_nSiX_2R$$

wherein: (1) $n$ is an integer from 0 to 2, (2) X is a member selected from the group consisting of alkyl groups and acyloxy groups, (3) at least one group represented by X is an acyloxy group, and (4) R is an alkyl group, which comprises heating a mixture of an alkylsiloxane, at least one organic acyloxy compound that is represented by the graphical formula:

$$R''COOR'''$$

wherein R'' is a group selected from the group consisting of alkyl groups that contain from 1 to 17 carbon atoms, aryl groups and the hydrogen atom and wherein R''' is a group selected from the group consisting of the hydrogen atom and OCR'' groups and a catalytic amount of sulfuric acid to a temperature sufficiently elevated to cause the alkylsiloxane and said organic acyloxy compound to react to produce said acyloxysilicon compounds and, when the group represented by R''' is a hydrogen atom, water, while continuously removing the water formed in the reaction.

2. A process for producing acyloxysilicon compounds that are represented by the graphical formula,

wherein: (1) $n$ is an integer from 0 to 2, (2) X is a member selected from the group consisting of alkyl groups and acyloxy groups, (3) at least one group represented by X is an acyloxy group, and (4) R is an alkyl group, which comprises heating a mixture of an alkylsiloxane, said alkylsiloxane corresponding to the graphical formula $$(R_3SiO_{0.5})_q(R_2SiO)_r(RSiO_{1.5})_s$$

wherein R is an alkyl group and wherein $q$, $r$ and $s$ are zero or integers and have a sum of at least 2, a monocarboxylic organic acid and a catalytic amount of sulfuric acid to a temperature sufficiently elevated to cause the alkylsiloxane and the organic acid to react to produce said acyloxysilicon compounds and water, while continuously removing the water formed in the reaction.

3. A process for producing acyloxysilicon compounds that are represented by the graphical formula,

wherein: (1) $n$ is an integer from 0 to 2, (2) X is a member selected from the group consisting of alkyl groups and acyloxy groups, (3) at least one group represented by X is an acyloxy group, and (4) R is an alkyl group, which comprises heating a mixture of an alkylsiloxane, a monocarboxylic organic acid and a catalytic amount of sulfuric acid to a temperature sufficiently elevated to cause the alkylsiloxane and the organic acid to react to produce said acyloxysilicon compounds and water, while continuously removing the water formed in the reaction.

4. A process for producing acyloxysilicon compounds that are represented by the graphical formula,

wherein: (1) $n$ is an integer from 0 to 2, (2) X is a member selected from the group consisting of alkyl groups and acyloxy groups, (3) at least one group represented by X is an acyloxy group, and (4) R is an alkyl group, which comprises heating a mixture of an alkylsiloxane, a monocarboxylic organic acid, the anhydride of a monocarboxylic organic acid and a catalytic amount of sulfuric acid to a temperature sufficiently elevated to cause the alkylsiloxane and the organic acid to react to produce said acyloxysilicon compounds.

5. A process for producing acyloxysilicon compounds that are represented by the graphical formula,

wherein: (1) $n$ is an integer from 0 to 2, (2) X is a member selected from the group consisting of alkyl groups and acyloxy groups, (3) at least one group represented by X is an acyloxy group, and (4) R is an alkyl group, which comprises heating a mixture of an alkylsiloxane, a monocarboxylic organic acid and a catalytic amount of sulfuric acid, said organic acid being present in an amount of from about 0.5 to about 10.0 gram-moles of the organic acid per gram-atom of combined silicon in said alkylsiloxane, to a temperature sufficiently elevated to cause the alkylsiloxane and the organic acid to react to produce said acyloxysilicon compounds and water, while continuously removing the water formed in the reaction.

6. A process for producing acyloxysilicon compounds that are represented by the graphical formula,

wherein: (1) $n$ is an integer from 0 to 2, (2) X is a member selected from the group consisting of alkyl groups and acyloxy groups, (3) at least one group represented by X is an acyloxy group, and (4) R is an alkyl group, which comprises heating a mixture of an alkylsiloxane, a monocarboxylic organic acid, said organic acid being present in an amount of from about 1 to about 5 grammoles of the organic acid per gram-atom of combined silicon in said alkylsiloxane, and a catalytic amount of sulfuric acid, to a temperature sufficiently elevated to cause the alkylsiloxane and the organic acid to react to produce said acyloxysilicon compounds and water, while continuously removing the water formed in the reaction.

7. A process for producing acyloxysilicon compounds that are represented by the graphical formula,

wherein: (1) $n$ is an integer from 0 to 2, (2) X is a member selected from the group consisting of alkyl groups and acyloxy groups, (3) at least one group represented by X is an acyloxy group, and (4) R is an alkyl group, which comprises heating a mixture of an alkylsiloxane, a monocarboxylic aliphatic acid, said aliphatic acid containing from 1 to 18 carbon atoms per molecule, and a catalytic amount of sulfuric acid, to a temperature sufficiently elevated to cause the alkylsiloxane and the aliphatic acid to react to produce said acyloxysilicon compounds and water, while continuously removing the water formed in the reaction.

8. A process for producing acyloxysilicon compounds that are represented by the graphical formula,

wherein: (1) $n$ is an integer from 0 to 2, (2) X is a member selected from the group consisting of alkyl groups and acyloxy groups, (3) at least one group represented by X is an acyloxy group, and (4) R is an alkyl group, which comprises heating a mixture of an alkylsiloxane, the anhydride of a monocarboxylic aliphatic acid, said carboxylic aliphatic acid containing from 1 to 18 carbon atoms per molecule, and a catalytic amount of sulfuric acid, to a temperature sufficiently elevated to cause the alkylsiloxane and the anhydride to react to produce said acyloxysilicon compounds.

9. A process for producing acyloxysilicon compounds that are represented by the graphical formula,

wherein: (1) $n$ is an integer from 0 to 2, (2) X is a member selected from the group consisting of alkyl groups and acyloxy groups, (3) at least one group represented by X is an acyloxy group, and (4) R is an alkyl group, which comprises heating a mixture of an alkylsiloxane, a monocarboxylic aliphatic acid, said aliphatic acid containing from 2 to 7 carbon atoms per molecule, and a catalytic amount of sulfuric acid, to a temperature sufficiently elevated to cause the alkylsiloxane and the aliphatic acid to react to produce said acyloxysilicon compounds and water, while continuously removing the water formed in the reaction.

10. A process for producing acyloxysilicon compounds that are represented by the graphical formula,

wherein: (1) $n$ is an integer from 0 to 2, (2) X is a member selected from the group consisting of alkyl groups and acyloxy groups, (3) at least one group represented by X is an acyloxy group, and (4) R is an alkyl group, which comprises heating a mixture of an alkylsiloxane, the anhydride of a monocarboxylic aliphatic acid, said monocarboxylic aliphatic acid containing from 2 to 7 carbon atoms per molecule, and a catalytic amount of sulfuric acid, to a temperature sufficiently elevated to cause the alkylsiloxane and the anhydride to react to produce said acyloxysilicon compounds.

11. A process for producing acyloxysilicon compounds that are represented by the graphical formula,

wherein: (1) $n$ is an integer from 0 to 2, (2) X is a member selected from the group consisting of alkyl groups and acyloxy groups, (3) at least one group represented by X is an acyloxy group, and (4) R is an alkyl group, which comprises heating a mixture of an alkylsiloxane, a monocarboxylic organic acid and a catalytic amount of sulfuric acid to a temperature of from about 50° C. to about 235° C. to cause the alkylsiloxane and the organic acid to react to produce said acyloxysilicon compounds and water, while continuously removing the water formed in the reaction.

12. A process for producing acyloxysilicon compounds that are represented by the graphical formula, $$X[RXSiO]_n SiX_2 R$$

wherein: (1) $n$ is an integer from 0 to 2, (2) X is a member selected from the group consisting of alkyl groups and acyloxy groups, (3) at least one group represented by X is an acyloxy group, and (4) R is an alkyl group, which comprises heating a mixture of an alkylsiloxane, a monocarboxylic organic acid and a catalytic amount of sulfuric acid to a temperature of from about 100° C. to about 200° C. to cause the alkylsiloxane and the organic acid to react to produce said acyloxysilicon compounds and water, while continuously removing the water formed in the reaction.

13. A process for producing acyloxysilicon compounds that are represented by the graphical formula, $$X[RXSiO]_n SiX_2 R$$

wherein: (1) $n$ is an integer from 0 to 2, (2) X is a member selected from the group consisting of alkyl groups and acyloxy groups, (3) at least one group represented by X is an acyloxy group, and (4) R is an alkyl group, which comprises heating a mixture of an alkylsiloxane, a liquid organic compound that forms an azeotrope with water, a monocarboxylic organic acid and a catalytic amount of sulfuric acid to a temperature sufficiently elevated to cause the alkylsiloxane and the organic acid to react to produce said acyloxysilicon compounds and water and to cause the mixture to boil, while continuously removing water formed in the reaction as a distillate containing an azeotrope comprising said water and said liquid organic compound.

14. A process for producing diacetoxydimethylsilane, acetoxydimethylsiloxyacetoxydimethylsilane and bis(acetoxydimethylsiloxy)dimethylsilane which comprises heating a mixture of octamethylcyclotetrasiloxane, acetic anhydride, acetic acid and a catalytic amount of sulfuric acid at about 136° C.–147° C. for about 40 hours and producing diacetoxydimethylsilane, acetoxydimethylsiloxyacetoxydimethylsilane and bis(acetoxydimethylsiloxy)dimethylsilane.

References Cited in the file of this patent
UNITED STATES PATENTS

| | | |
|---|---|---|
| 2,550,003 | Daudt | Apr. 24, 1951 |
| 2,634,285 | Rust et al. | Apr. 7, 1953 |
| 2,658,908 | Nitzsche et al. | Nov. 10, 1953 |
| 2,673,843 | Humphrey et al. | Mar. 30, 1954 |
| 2,698,334 | Rust et al. | Dec. 28, 1954 |
| 2,746,982 | Hyde | May 22, 1956 |
| 2,826,599 | Meals | Mar. 11, 1958 |